(12) United States Patent
LaCrosse (10) Patent No.: US 11,326,915 B2
(45) Date of Patent: May 10, 2022

(54) FLOW MEASUREMENT DEVICE FOR PIPES WHEN FLUID FLOW IS DISCHARGED TO ATMOSPHERE

(71) Applicant: William R. LaCrosse, Alpharetta, GA (US)

(72) Inventor: William R. LaCrosse, Alpharetta, GA (US)

(*) Notice: Subject to any disclaimer, the term of this patent is extended or adjusted under 35 U.S.C. 154(b) by 75 days.

(21) Appl. No.: 16/712,596

(22) Filed: Dec. 12, 2019

(65) Prior Publication Data
US 2020/0191626 A1   Jun. 18, 2020

Related U.S. Application Data

(60) Provisional application No. 62/778,533, filed on Dec. 12, 2018.

(51) Int. Cl.
   *G01F 1/58*    (2006.01)
   *G01F 1/684*   (2006.01)
   *G01F 1/26*    (2006.01)

(52) U.S. Cl.
   CPC .............. *G01F 1/58* (2013.01); *G01F 1/6842* (2013.01); *G01F 1/26* (2013.01)

(58) Field of Classification Search
   CPC .................................................. G01F 1/34–44
   See application file for complete search history.

(56) References Cited

U.S. PATENT DOCUMENTS

| 4,130,017 A * | 12/1978 | Benedict | G01F 1/42 73/861.61 |
| 4,787,254 A * | 11/1988 | Duckworth | G01F 1/36 73/861.62 |
| 5,363,699 A * | 11/1994 | McCall | F15D 1/02 73/198 |
| 8,701,497 B2 * | 4/2014 | Grenning | G01F 1/42 73/716 |
| 9,857,005 B2 * | 1/2018 | Wright | F16L 25/08 |

* cited by examiner

*Primary Examiner* — Justin N Olamit
(74) *Attorney, Agent, or Firm* — Welsh Flaxman & Gitler LLC (57) ABSTRACT

A flow meter includes a cylindrical body having an exterior surface and an interior surface defining an inner diameter of the cylindrical body. The cylindrical body also includes an outlet end and an inlet end. The inlet end is shaped and dimensioned for selective attachment to an inlet pipe or hose having an inner diameter that is small than the inner diameter of the cylindrical body. The flow meter also includes a gauge tap formed within the cylindrical body, the gauge tap being positioned adjacent the outlet end of the cylindrical body at a position between the outlet end and the inlet end. A pressure gauge is secured within the gauge tap for measuring the pressure within the cylindrical body and ultimately the flow of fluid through the cylindrical body. A nozzle is attached at the outlet end of the cylindrical body and at least one nozzle insert is provided for selective attachment to the nozzle so as reduce the size of the outlet in order to extend the normal range of the flow meter.

20 Claims, 8 Drawing Sheets

FLOW CHART

| PSI | 1-1/8"" | 1-3/4" | 2-1/2" | PSI | 1-1/8"" | 1-3/4" | 2-1/2" | PSI | 1-1/8"" | 1-3/4" | 2-1/2" |
|---|---|---|---|---|---|---|---|---|---|---|---|
| 7 | (92)* | (220) | (390) | 34 | 203 | 485 | 859 | 61 | 272 | 650 | 1150 |
| 8 | (99) | (235) | (417) | 35 | 206 | 492 | 871 | 62 | 275 | 655 | 1160 |
| 9 | (105) | (250) | (442) | 36 | 209 | 499 | 884 | 63 | 277 | 661 | 1169 |
| 10 | 110 | 263 | 466 | 37 | 212 | 506 | 896 | 64 | 279 | 666 | 1178 |
| 11 | 116 | 276 | 489 | 38 | 215 | 513 | 908 | 65 | 281 | 671 | 1188 |
| 12 | 121 | 288 | 510 | 39 | 218 | 520 | 920 | 66 | 283 | 676 | 1197 |
| 13 | 126 | 300 | 531 | 40 | 221 | 526 | 932 | 67 | 286 | 681 | 1206 |
| 14 | 131 | 311 | 551 | 41 | 223 | 533 | 943 | 68 | 288 | 686 | 1215 |
| 15 | 135 | 322 | 570 | 42 | 226 | 539 | 955 | 69 | 290 | 691 | 1224 |
| 16 | 139 | 333 | 589 | 43 | 229 | 546 | 966 | 70 | 292 | 696 | 1232 |
| 17 | 144 | 343 | 607 | 44 | 231 | 552 | 977 | 71 | 294 | 701 | 1241 |
| 18 | 148 | 353 | 625 | 45 | 234 | 558 | 988 | 72 | 296 | 706 | 1250 |
| 19 | 152 | 363 | 642 | 46 | 237 | 565 | 999 | 73 | 298 | 711 | 1259 |
| 20 | 156 | 372 | 659 | 47 | 239 | 571 | 1009 | 74 | 300 | 716 | 1267 |
| 21 | 160 | 381 | 675 | 48 | 242 | 577 | 1021 | 75 | 302 | 721 | 1276 |
| 22 | 164 | 390 | 691 | 49 | 244 | 583 | 1031 | 76 | | 726 | 1284 |
| 23 | 167 | 399 | 706 | 50 | 247 | 589 | 1042 | 77 | | 730 | 1293 |
| 24 | 171 | 408 | 722 | 51 | 249 | 594 | 1052 | 78 | | 735 | 1301 |
| 25 | 174 | 416 | 736 | 52 | 252 | 600 | 1062 | 79 | | 740 | 1309 |
| 26 | 178 | 424 | 751 | 53 | 254 | 606 | 1072 | 80 | | 744 | 1317 |
| 27 | 181 | 433 | 765 | 54 | 256 | 612 | 1082 | 81 | | 749 | 1326 |
| 28 | 185 | 440 | 779 | 55 | 259 | 617 | 1092 | 82 | | 754 | 1334 |
| 29 | 188 | 448 | 793 | 56 | 261 | 623 | 1102 | 83 | | 758 | 1342 |
| 30 | 191 | 456 | 807 | 57 | 263 | 628 | 1112 | 84 | | 763 | 1350 |
| 31 | 194 | 463 | 820 | 58 | 266 | 634 | 1121 | 85 | | 767 | 1358 |
| 32 | 197 | 471 | 833 | 59 | 268 | 639 | 1131 | 86 | | 772 | 1366 |
| 33 | 200 | 478 | 846 | 60 | 270 | 645 | 1141 | 87 | | 776 | 1374 |

* (xx)psi Readings, Reference only, not FM approved

FIG. 7

FLOW MEASUREMENT DEVICE FOR PIPES WHEN FLUID FLOW IS DISCHARGED TO ATMOSPHERE

BACKGROUND OF THE INVENTION

1. Field of the Invention

This invention relates to the measurement of fluid flow through pipes when discharging to the atmosphere.

2. Description of the Related Art

Many processes require verification of the flow inside of piping to monitor performance. Many different technologies are available to determine flow rates. Some use designs that rely on Bernoulli's theorem to equate the differential pressure at two points during fluid flow in piping to determine an accurate reading of the flow. When fluid flow is discharged to the atmosphere, one component of Bernoulli's equation drops to zero and only one measurement therefore is needed to determine the flow.

Orifice plates located at the exit of the pipe only require one pressure reading but they severely restrict the fluid flow due to the reduced exit diameter. A pitot tube is a perfect example of measuring one pressure reading to obtain an accurate determination of the flow exiting a pipe.

A pitot tube is portable and very accurate in the hands of a qualified operator. However, precise axial positioning and perpendicular movement of a pitot tube is required to ensure accurate readings. In particular, a pitot tube requires access to the exiting flow stream and placement of the pitot tube into the stream. As such, measurement of a fluid flow exiting a pipe can be very difficult.

Some devices offer a fixed pitot tube device located in the center of the pipe. However, the accuracy of these devices is low since movement perpendicular to the fluid to determine the center of maximum pressure is fixed. The center of maximum pressure is never in the center of the flow stream on systems with inlet flexible hoses or inlet fittings close to the exiting flow stream.

Newer devices offer a side tap gauge location along an inclined nozzle to equate the pressure to the flow exiting the pipe. However, these systems can snag particles conveyed in the flow stream at the tap location due to the angle of the nozzle. The device, by design, restricts the potential flow by reducing the discharge diameter through the nozzle from the inlet pipe diameter. Restriction of flow restricts the range of the device.

SUMMARY OF THE INVENTION

It is, therefore, an object of the present invention to provide a flow meter including a cylindrical body having an exterior surface and an interior surface defining an inner diameter of the cylindrical body. The cylindrical body also includes an outlet end and an inlet end. The inlet end is shaped and dimensioned for selective attachment to an inlet pipe having an inner diameter that is smaller than the inner diameter of the cylindrical body. The flow meter also includes a gauge tap formed within the cylindrical body. The gauge tap is positioned adjacent the outlet end of the cylindrical body at a position between the outlet end and the inlet end. A pressure gauge is secured to the gauge tap for measuring the pressure within the cylindrical body and ultimately the flow of fluid through the cylindrical body. A nozzle is attached at the outlet end of the cylindrical body and at least one nozzle insert is provided for selective attachment to the nozzle so as reduce the size of the outlet in order to extend the normal range of the flow meter.

It is another object of the present invention to provide a flow meter including at least one vane positioned within the cylindrical body along the interior surface of the cylindrical body. The at least one vane is shaped and dimensioned to prevent swirling flow ahead of the gauge tap location.

It is a further object of the present invention to provide a flow meter wherein the at least one vane includes a plurality of vanes.

It is also an object of the present invention to provide a flow meter wherein the at least one nozzle has a diameter insert matching the inner diameter of the inlet pipe.

It is another object of the present invention to provide a flow meter wherein the at least one nozzle insert includes a plurality of nozzle inserts that may be selectively changed.

It is a further object of the present invention to provide a flow meter including a cylindrical body having an exterior surface and an interior surface defining an inner diameter of the cylindrical body, as well as an externally threaded outlet end and an internally threaded inlet end. The internally threaded inlet end is shaped and dimensioned for selective attachment to an inlet pipe. A gauge tap is formed within the cylindrical body. The gauge tap is positioned adjacent the outlet end of the cylindrical body at a position between the externally threaded outlet end and the internally threaded inlet end, wherein the inner diameter of the cylindrical body at the gauge tap is greater than the inner diameter at the internally threaded inlet end. A nozzle is attached via threads over the externally threaded outlet end of the cylindrical body.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

With reference to FIGS. 1 to 7, a flow meter 10 is disclosed that uses Bernoulli's principles to obtain a single fluid pressure reading to determine an accurate reading of the fluid flow in a pipe that exits to atmospheric pressure. It should appreciated that a first embodiment is disclosed with reference to FIGS. 1, 2A, and 2B and a second embodiment is disclosed with reference to FIGS. 3, 4, 5, and 6A-D, but similar reference numerals are used herein for the similar structures. It should also be appreciated, that unless expressly noted herein the following disclosure is intended to apply to both embodiments.

In contrast to the prior art, the present flow meter 10 increases the diameter of the incoming water stream at the point of the pressure reading instead of decreasing the diameter of the incoming water stream as is conventional in prior art devices. When the diameter of the flow meter 10 is increased in accordance with present invention, the fluid velocities are slowed, allowing for a conditioned, stable pressure reading which is easily convertible to an accurate measure of the fluid flow. As the fluid exits the cylindrical body 12 where pressure readings are taken and enters the nozzle 28, the fluid returns to a tubing diameter that is less than the diameter of the cylindrical body in which the pressure reading is taken. In particular, and in accordance with a preferred embodiment, the tubing diameter after the fluid passes through the cylindrical body is reduced to the same or less than the diameter at the inlet piping. The fluid flow is not restricted as it travels through the flow meter 10 providing an accurate, stable reading to provide the highest possible flow reading.

The flow meter 10 offers insertable, changeable nozzle inserts 30 of smaller diameter to provide accurate readings at lower flows without having to replace the cylindrical body 12 containing the gauge tap 24. As will be explained below in further detail, the nozzle inserts 30 allow an operator to control the pressure reading within the cylindrical body 12 such that the pressure reading within the cylindrical body 12 is maintained at a level that will allow for accurate readings. For example, in systems where the fluid flow rate is lower, the pressure within the cylindrical body 12 might not be sufficiently high to allow for the pressure gauge 26 to obtain readings that are within the desired range based upon the calibration of the pressure gauge 26. As such, and by inserting a nozzle insert 30 with a small diameter at a position downstream of the pressure gauge 26, it is possible to raise the readings obtained by the pressure gauge 26 such that they are within the desired range for obtaining accurate readings.

Referring to FIGS. 1 to 6, the flow meter 10 includes a cylindrical body 12 having an exterior surface 14 and an interior surface 16 defining an inner diameter of the cylindrical body 12, as well as an outlet end 18 and an inlet end 20. As will be appreciated based upon the following disclosure and the attachment of various elements at the outlet end 18 and the inlet end 20, the outlet end 18 is externally threaded and the inlet end 20 is internally threaded. It should be appreciated the interior surface of the cylindrical body 12 is considered that portion of the cylindrical body 12 between the outlet end 18 and the inlet end 20. As such, the interior surface 16 is not considered to include either the outlet end 18 or the inlet end 20, and the inner diameter of the cylindrical body 12 is considered to be that portion of the cylindrical body lying between the outlet end 18 and the inlet end 20.

The inlet end 20 is shaped and dimensioned for selective attachment to an inlet pipe (or more) 22 having an inner diameter that is smaller than the inner diameter of the cylindrical body 12. As such, both the inlet end 20 and the inlet pipe 22 have inner diameters that are smaller than the inner diameter of the cylindrical body 12. The flow meter 10 also includes a gauge tap 24 formed within the cylindrical body 12. The gauge tap 24 is positioned adjacent the outlet end 18 of the cylindrical body 12 at a position between the outlet end 18 and the inlet end 20. A pressure gauge 26 is secured within the gauge tap 24 for measuring the pressure within the cylindrical body 12 and ultimately the flow of fluid through the cylindrical body 12. The inner diameter of the cylindrical body 12 at the gauge tap 24 is greater than the inner diameter at the internally threaded inlet end 20.

A nozzle 28 is attached at the outlet end 18 of the cylindrical body 12. The outlet end 18 is provided with an inner diameter that is smaller than the inner diameter of the cylindrical body 12. In accordance with a preferred embodiment, the inlet end 20 and the outlet end 18 have approximately the same inner diameters, as it is common for both the inlet pipe 22 and the nozzle 28 to have approximately the same inner diameters The flow meter 10 is further provided with at least one nozzle insert 30 having an inner diameter that is smaller than the inner diameter of the outlet end 18 of the flow meter, and consequently smaller than the inner diameter of the cylindrical body 12.

At least one vane 32 is positioned within the cylindrical body 12 along the interior surface 16 of the cylindrical body 12. The at least one vane 32 is shaped and dimensioned to prevent swirling flow ahead of the nozzle 28. In particular, it is known that most field installations have piping arrangements that induce swirling and non-laminar behavior of the fluid flow as it approaches the inlet of a flow measurement device. Examples include elbows, valves, flexible hoses, tees, obstructions, etc. As the flow comes into a flow measurement device with a velocity component perpendicular to the axis of the flow (swirling), the tap location will inadvertently report this velocity as a false flow. In order to prevent the swirling due to non-laminar inlet piping arrangements, the present flow meter 10 is provided with a vane(s) 32 that straighten the flow stream before reaching the gauge tap 24 location. The vane(s) 32 eliminates this flow component so the velocity pressure is reported accurately. Generally, one to three vanes 32 are sufficient to eliminate the velocity component before the fluid reaches the gauge tap 24 location. The vane(s) 32 are not needed when encountering laminar flow streams. While a vane is disclosed in accordance with the disclosed embodiment, it is appreciated that a vane need not be included with cylindrical body and the vane is simply an accessory that may only be needed to address specific flow conditions.

Considering first the cylindrical body 12, it is an elongated tubular member to which an outlet end 18 and an inlet end 20 are secured at the first and second ends thereof, respectively. Since the body 12 is cylindrical it also includes an exterior surface 14 defining an outer diameter of the cylindrical body 12 and an interior surface 16 defining the inner diameter of the cylindrical body 12.

Extending between the exterior surface 14 of the cylindrical body 12 and the interior surface 14 of the cylindrical body 12, and positioned between the inlet end 20 and the outlet end 18, the gauge tap 24 is formed. The gauge tap 24 is an aperture 34 extending from the exterior surface 14 to the interior surface 16 such that a pressure gauge 26 maybe inserted therethrough to access and measure the pressure within the cylindrical body 12. In accordance with a preferred embodiment, the aperture 34 of the gauge tap 24 is internally threaded such that the pressure gauge 26 can be screwed therein and thereby attached to the cylindrical body 12.

While a pressure gauge is disclosed for use in accordance with a preferred embodiment, it should be appreciated that other measuring devices may be used, including, but not limited to, a pressure device or a connection to a remote reading gauge or pressure reading device. Such alternate measuring devices would be similarly secured within the gauge tap for measuring the pressure within the cylindrical body and ultimately the flow of fluid through the cylindrical body.

The interior surface 14 of the cylindrical body 12 may be formed with various profiles so long as the inner diameter in the area in which the pressure readings are taken, that is the longitudinal position along the length of the cylindrical body 12 in which the gauge tap 24 is formed, is sufficient for taking pressure readings and for conveniently calculating the flow being pumped through the system. For example, and in accordance with one embodiment disclosed with reference to FIGS. 1, 2A, and 2B, the inner diameter of the cylindrical body 12 is consistent from the first end thereof to the second end thereof. In this embodiment, the gauge tap 24 is located along the length of the cylindrical body at a position that is slightly closer to the outlet end 18 of the flow meter 10. In accordance with another embodiment disclosed with reference to FIGS. 3, 4, 5, and 6A-D, the interior surface 14 of the cylindrical body 12 is tapered to increase in diameter as it extends from the inlet end 20 to a position slightly beyond the longitudinal center of the cylindrical body 12. From this point slightly beyond the longitudinal center of the cylindrical body 12 to the outlet end 18, the inner diameter is consistent. In this embodiment, the gauge tap 24 is centrally located between the point slightly beyond the longitudinal center of the cylindrical body 12 and the outlet end 18 such that it sits approximately at the longitudinal center of the section with a consistent inner diameter.

The inlet end 20 of the cylindrical body 12 is shaped and dimensioned for selective attachment to an inlet pipe 22 having an inner diameter that is smaller than the inner diameter of the cylindrical body 12. The connection of the cylindrical body 12 with the inlet pipe 22 is achieved using known pipe fittings allowing for ready connection and disconnection of the cylindrical body 12 with the inlet pipe 22.

The nozzle 28 is a substantially cylindrically shaped member 36 and includes a first end 38 and second end 40. A passageway 42 extends from the first end 38 of the nozzle 28 to the second end 40 of the nozzle 28 along a longitudinal axis of the nozzle 28. The nozzle 28 also includes an interior surface 44 defining the inner diameter of the nozzle 28 and an exterior surface 46.

The nozzle 28 is selectively attached at the outlet end 18 of the cylindrical body 12. The nozzle 28 is attached at the outlet end 18 of the cylindrical body 12 via a threaded attachment assembly. In particular, the outlet end 18 of the cylindrical body 12 includes external threads 48 which are shaped and dimensioned for attachment to internal threads 50 formed along the first end 38 of the nozzle 28. With this in mind, the nozzle 28 includes the first end 38 at which the internal threads 50 are formed and which is adapted for direct attachment with the external threads 48 of the outlet end 18 of the cylindrical body 12. Fluid is expelled through the second end 40 in a manner well-known to those skilled in the art.

As will be appreciated based upon the following disclosure, it is important the outlet end 18 of the cylindrical body 12 abuts the first end 38 of the nozzle 28. As such, the outlet end 18 of the cylindrical body 12 is formed with an edge surface 52 lying in a plane substantially perpendicular to the longitudinal axis of the cylindrical body 12. Similarly, the first end 38 of the nozzle 28 is provided with an inwardly extending step 54 positioned at the end of the internal threads 50 of the nozzle 28 such that it is slightly removed from the distal surface at the first end 38 of the nozzle 28 and ultimately between the first end 38 and the second end 40 of the nozzle 28. When the nozzle 28 is screwed onto the outlet end 18 of the cylindrical body 12, the edge surface 52 of the outlet end 18 and the step 54 of the nozzle 28 ultimately come into contact, if there is nothing positioned therebetween. In accordance with the present invention, it is appreciated a washer 55 may be positioned along the step 54 of the nozzle 28.

As briefly discussed above, the flow meter 10 is provided with a plurality of nozzle inserts 30 for selective attachment to the nozzle 28 so as to reduce the diameter size of the nozzle outlet in order to extend the normal range of the flow meter 10; that is, extend the ability of the flow meter 10 to obtain useful readings with different pump flow rates without the need for one to completely replace the flow meter 10. As is appreciated, various pressure gauges 26 have different pressure ranges at which they operate effectively and provide accurate readings. By allowing an operator to reduce the effective inner diameter of a passageway downstream of the pressure gauge 26, that is, reduce the inner diameter of the nozzle passageway downstream of the cylindrical body 12, the pressure reading within the cylindrical body 12 is adjusted to level that will allow for accurate readings. For example, where the flow rate coming from a pump is only sufficient to produce a pressure reading of less than 5 psi, and the pressure gauge is unable to provide accurate readings at such a low pressure, a nozzle insert may be used to restrict the flow of water downstream of the pressure gauge by decreasing the effective diameter and thereby increasing the pressure reading at the pressure gauge.

The nozzle inserts 30 are shaped and dimensioned such that the inner diameters thereof are smaller than the inner diameter of the outlet end 18 of the flow meter 10, and consequently smaller than the inner diameter of the nozzle 18 and cylindrical body 12. As such, a plurality of nozzle inserts 30 with various inner diameters are provided so a user may select the nozzle insert 30 with an inner diameter resulting in the desired pressure reading with the cylindrical body 12.

With this in mind, it appreciated each exit nozzle insert diameter has a specific range of use. When flowing outside of that range, the flow is still predictable, but the equation for determining flow changes away from being a linear formula. Users of the flow meter 10 will switch to a different sized nozzle insert 30 (that is, a nozzle insert having a different inner diameter) to stay maintain pressure within the cylindrical body 12 at an appropriate level for the fluid flow of the system. Considering an exemplary embodiment for use in conjunction with a standard fire hose having an inner diameter of 2½" and a flow meter 10 having a cylindrical body 12 having an inner diameter of the area of the pressure gauge of 3", the following offers guidelines for usage. It should however be kept in mind, the hoses of various diameters may be used in conjunction with the present invention, and the dimensions of the flow meter need only to be adjusted accommodate such changes in the diameter of the hose.

Generally, the largest nozzle diameter, that is, where the inlet tube 22, for example, has an inner diameter of 2½", and the nozzle 28, for example, has an inner diameter of 2½" (thereby resulting in a 1:1 ratio for the device flow inlet:outlet nozzle diameter), provides for the majority of applications. Where a standard flow meter 10 having an inner diameter of 3" is used, it is contemplated two nozzle inserts 30 would be offered; one at 1¾" and one at 1⅛". In practice, the use of such nozzle inserts 30 would provide coverage from systems providing from 100 gpm (gallons per minute) to systems providing well over 1,000 gpm. By way of example, the nozzle insert 30 providing an inner diameter of 1⅛" would be used in conjunction with systems having pumps capable of achieving flow between 100 gpm and 300 gpm (that is, a 2½":1⅛" ratio between the device flow inlet:outlet nozzle diameter), the nozzle insert 30 providing an inner diameter of 1¾" would be used in conjunction with systems having pumps capable of achieving flow between 300 gpm to 700 gpm (that is, a 2½":1¾" ratio between the device flow inlet:outlet nozzle diameter), and the nozzle 28 without a nozzle insert 30 would be used in conjunction with systems having pumps capable of achieving flow between 500 gpm to 1,100 gpm (that is, a 2½":2½" ratio between the device flow inlet:outlet nozzle diameter). These three ranges are perfect when using the present flow meter 10 for its intended applications. Each size can be tailored to the flow expected, and the reduction percentage can be anything. For other markets, it is contemplated a 6" inlet size might be offered with 2 to 3 nozzle inserts 30 to cover an accurate range for the 6" unit.

Each of the nozzle inserts 30 includes a first end 60 and a second end 62 as well as a passageway 64 extending from the first end 60 to the second end 62, and defining the inner diameter of the nozzle insert 30. Each nozzle insert 30 also includes an exterior surface 66 having an external flange 68 extending therefrom. The flange 68 extends about the circumference of the nozzle insert 30 and is shaped and dimensioned for positioning between the abutment surface 52 of the cylindrical body 12 and the abutment surface 54 of the nozzle 28.

In particular, the nozzle 28 is removed by rotating the nozzle 28 relatively to the outlet end 18 of the cylindrical body 12. With the nozzle 28 removed, the nozzle insert 30 is inserted into the cylindrical body 12 such that the first end 60 thereof extends into the cylindrical body 12 and the second end 62 thereof sits outside of the cylindrical body 12. The nozzle insert 30 is shaped so as to produce a laminar hose stream on exit. As such, an in accordance with a preferred embodiment, the nozzle insert is tapered with a slope of reduction from 4 degrees to 7 degrees in order to prevent flow separation. This allows for a standard Pitot tube measurement check on the exiting stream. While a preferred shape is shown and disclosed herein it is appreciated other shapes may be used within the spirit of the present invention. The flange 68 of the nozzle insert 30 is positioned such that it sits next to the abutment surface 52 of the cylindrical body 12. Once the nozzle insert 30 is properly positioned, the nozzle 28 is reattached to the outlet end 18 of the cylindrical body 12. In particular, the first end 38 of the nozzle 28 is passed over the exterior surface 66 of the nozzle insert 30 until the internal threading 50 of the nozzle 28 meets the external threading 48 of the outlet end 18 of the cylindrical body 12. Thereafter, the nozzle 28 is rotated on to the cylindrical body 12 until the abutment surface 52 of the nozzle 28 comes into contact with the flange 68 of the nozzle insert 30. At this point, the nozzle insert 30 is securely held between the nozzle 28 and the cylindrical body 12 and is held in place within the assembly so as to reduce the diameter at the nozzle 28 to match the diameter of the inlet pipe 22.

Figure 1:
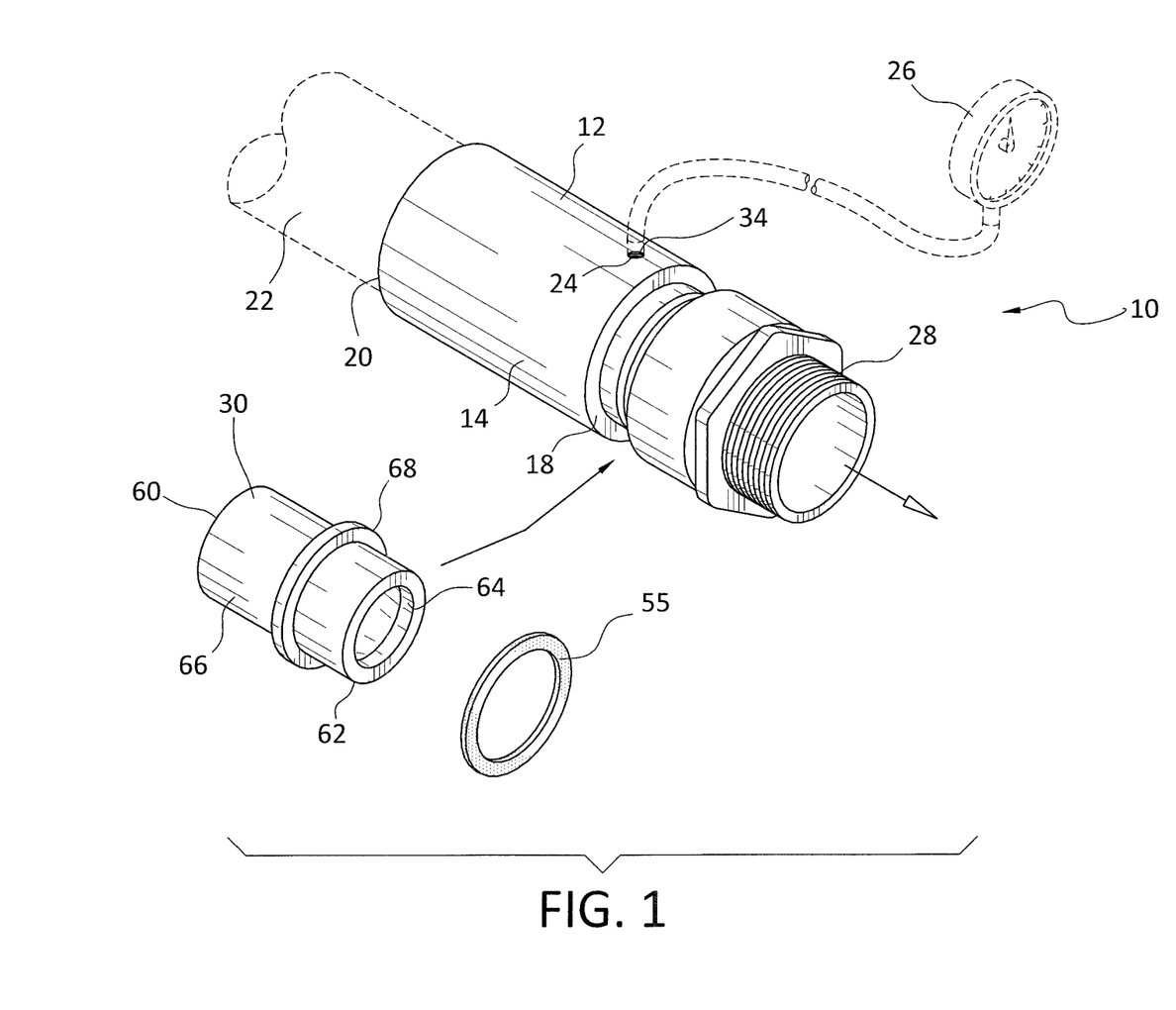
FIG. 1 is a perspective view of the flow meter in accordance with the present invention with the nozzle insert that is positioned within the nozzle also shown adjacent thereto.
Figure 2A:
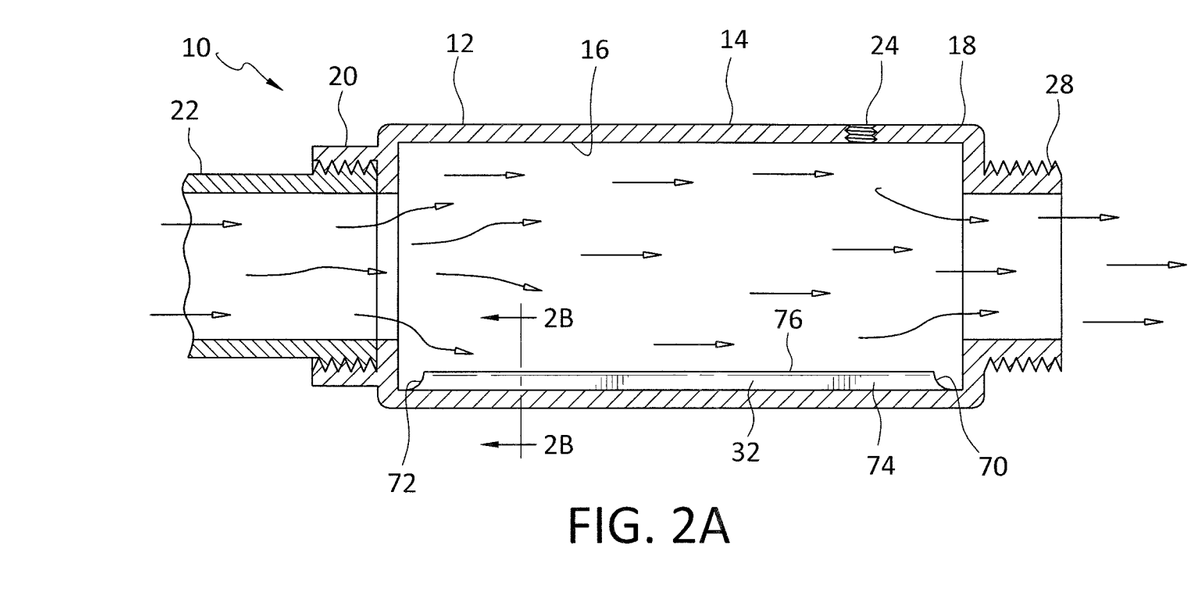
FIG. 2A is a cross sectional view of one embodiment of the flow meter without a nozzle insert attached to the cylindrical body.
Figure 2B:
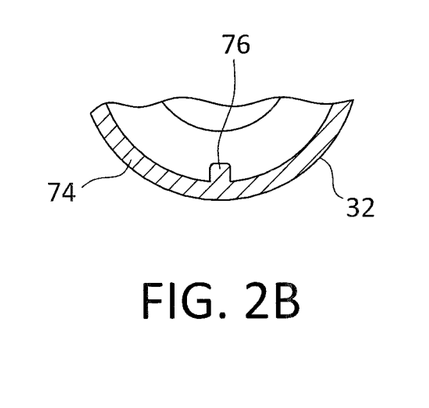
FIG. 2B is a cross sectional view of the cylindrical body along the line 2B-2B in FIG. 2A
Figure 3:
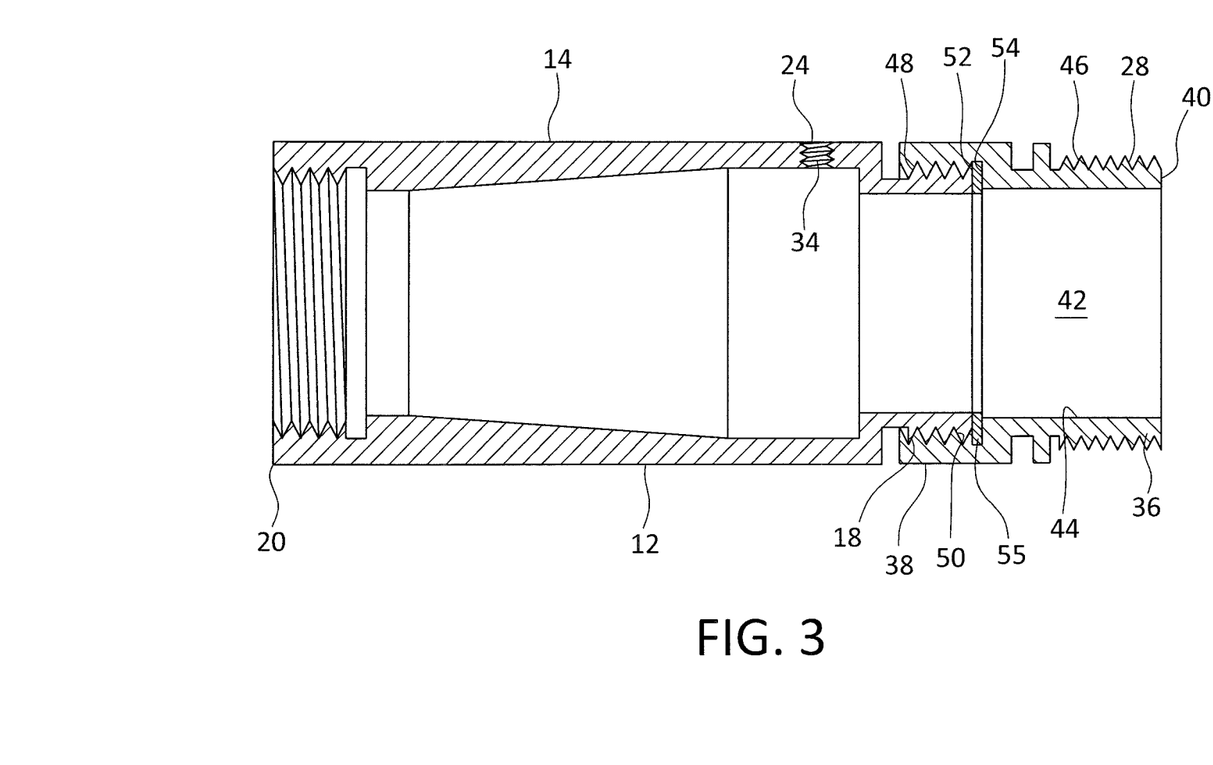
FIG. 3 is a cross section view of another embodiment of the flow meter showing the cylindrical body with the full bore nozzle insert installed for maximum flow readings, that is, with the nozzle secured to the cylindrical body and with no nozzle insert attached therebetween.
Figure 4:
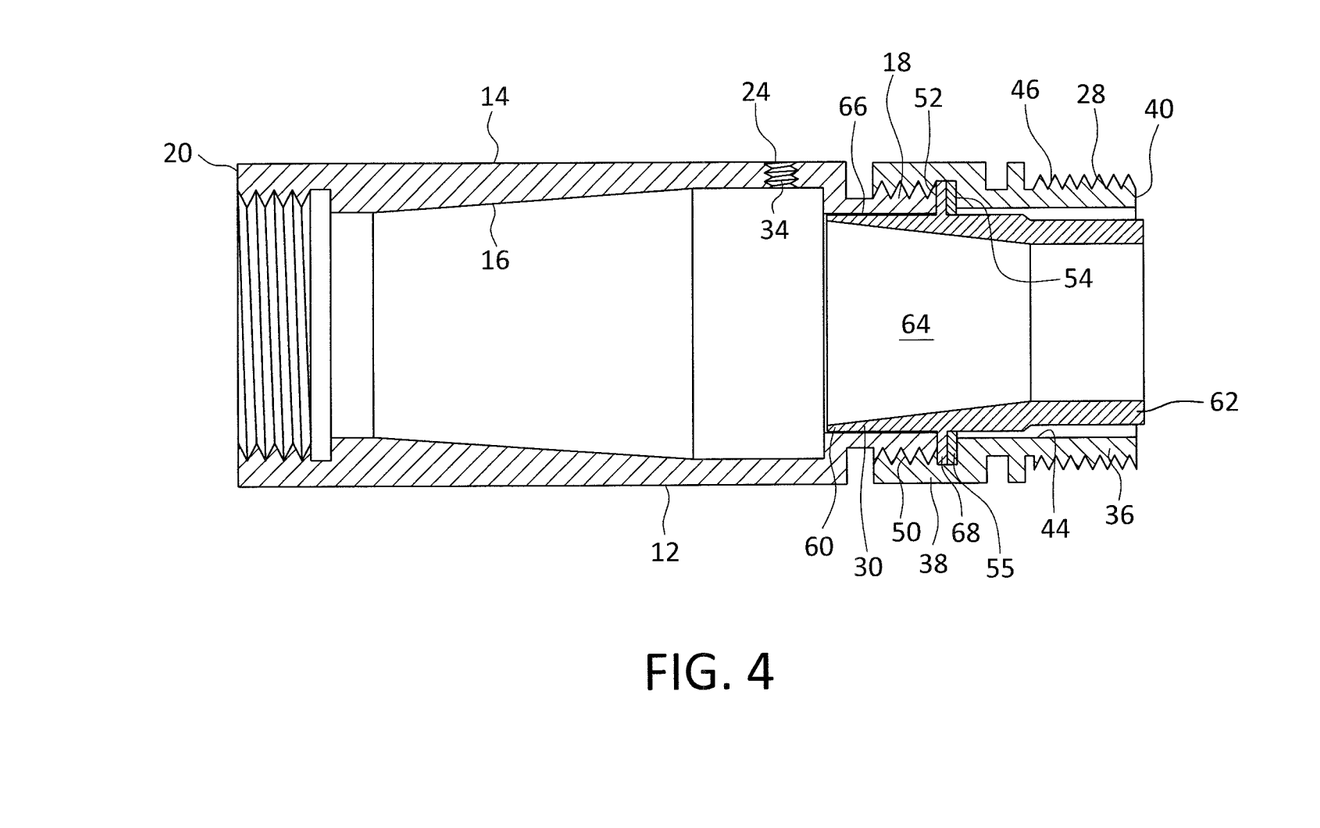
FIG. 4 is a cross section view of the flow meter shown in FIG. 3 showing the cylindrical body with a first nozzle insert installed that is designed for a lower flow range.
Figure 5:
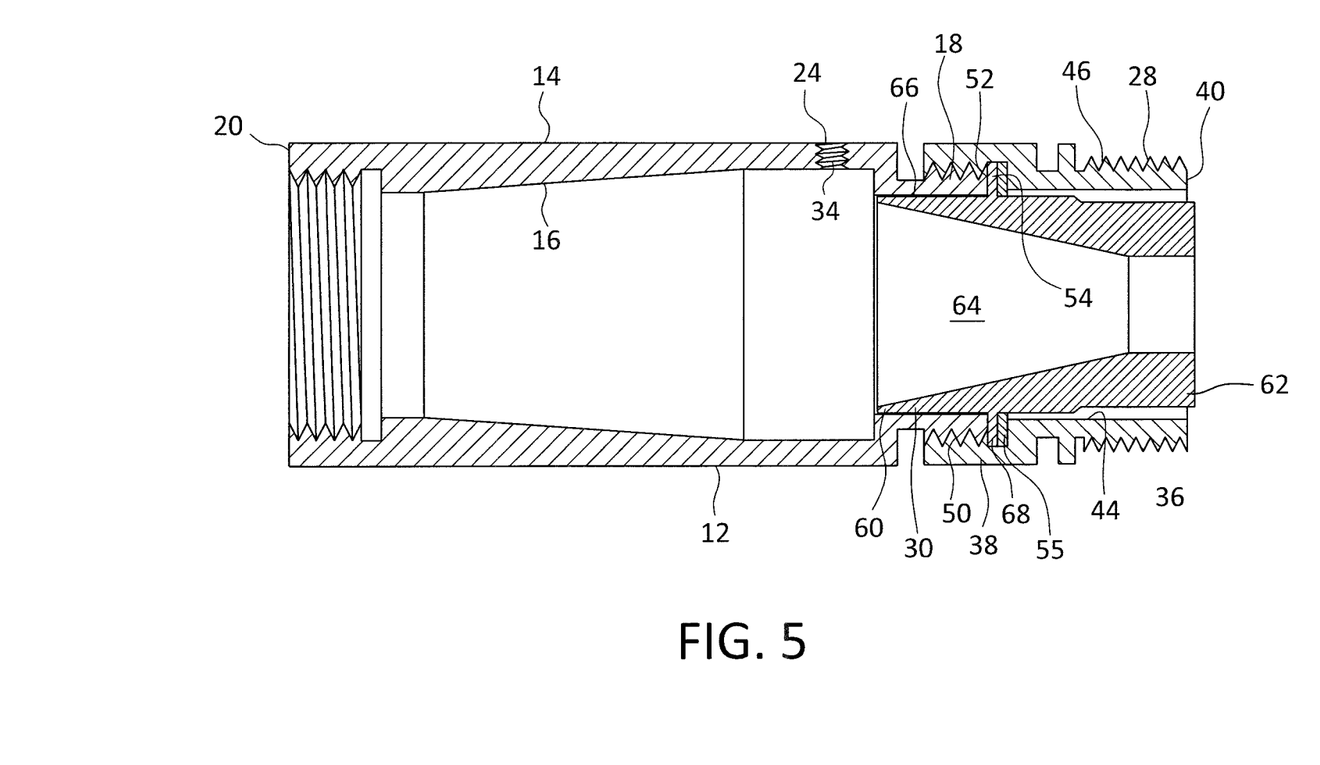
FIG. 5 is a cross section view of the flow meter shown in FIG. 3 showing the cylindrical body with a smaller nozzle insert installed for even less flow.
Figures 6A, 6B:
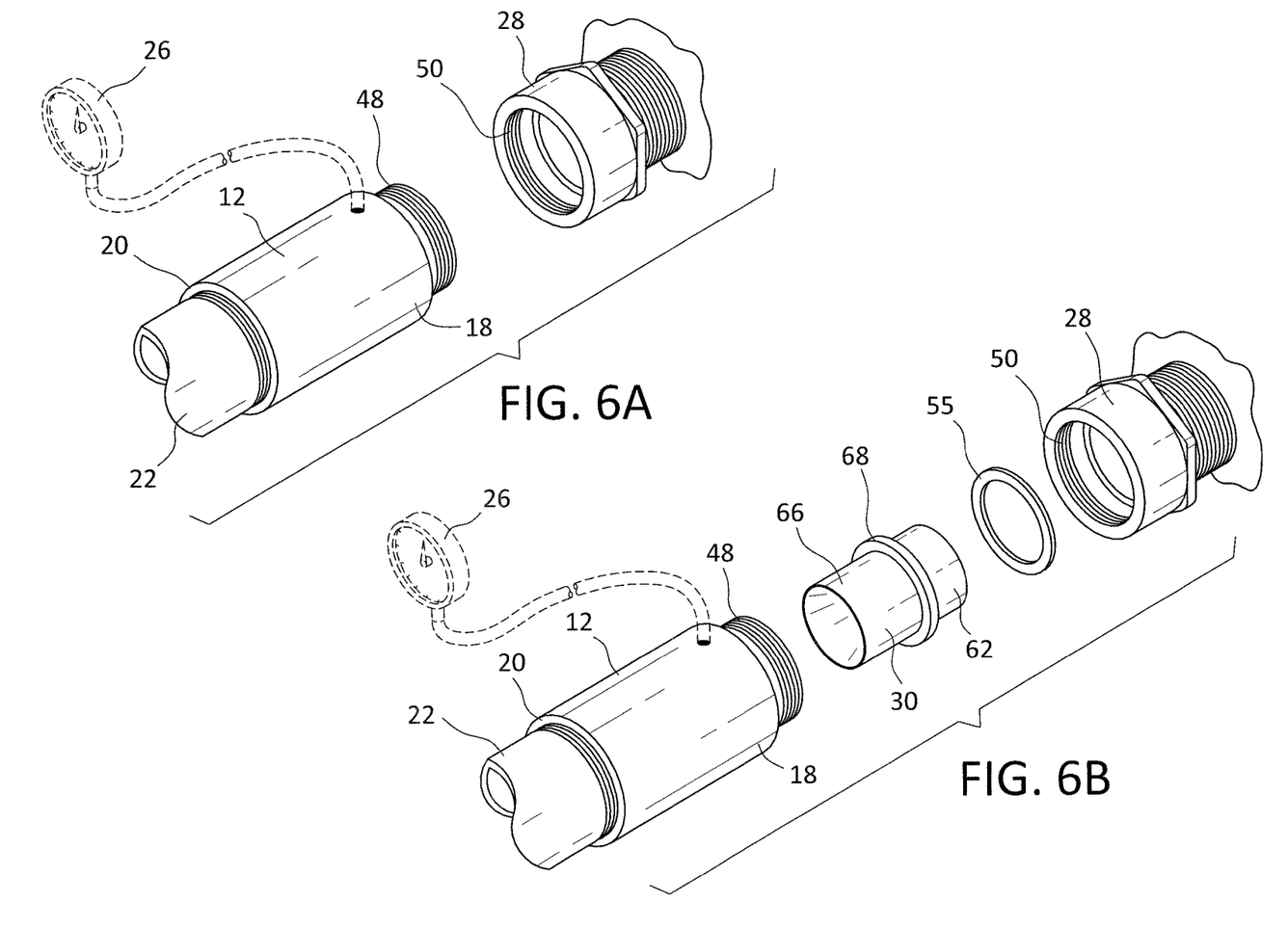
FIGS. 6A, 6B, 6C and 6D are perspective views showing the sequential steps in the installation of a nozzle insert in accordance with the present invention.
Figure 6C:
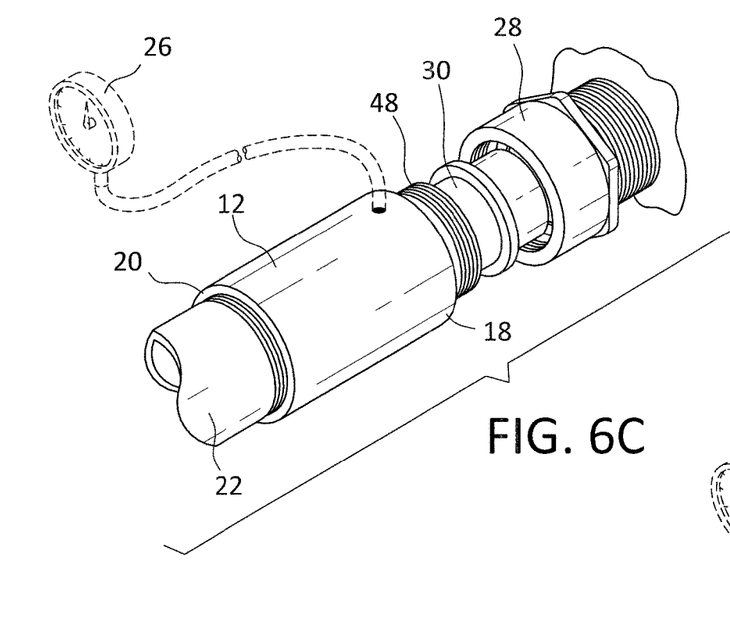
Figure 6D:
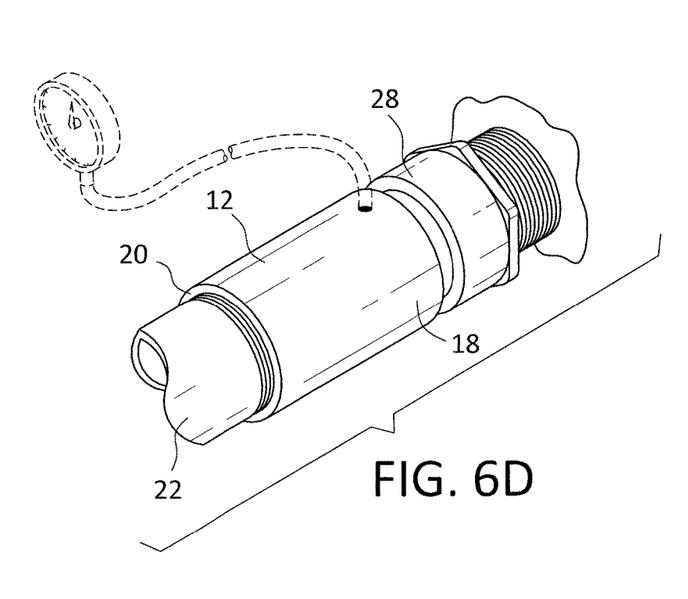

In addition to the nozzle inserts 30 for reducing the inner diameter, and as discussed above, the flow meter 10 is provided with one or more vanes 32 shaped and dimensioned for positioning within the cylindrical body 12 (see FIGS. 2A and 2B). In particular, the vanes 32 are shaped and dimensioned for positioning within the cylindrical body 12 along the interior surface 16 of the cylindrical body 12 and have a surface that is designed to prevent swirling flow at the nozzle 28.

With this in mind, each of the vanes 32 includes a first end 70 and a second end 72 with a vane body 74 extending therebetween. The vane body 74 is substantially in U-shaped when viewed along a cross-section taken perpendicular to the axis of the vane 32. However, and in effort to control fluid flow, each vane 32 is also provided with an upwardly extending fin 76. The upwardly extending fin 76 extends along the longitudinal axis of the vane 32 so as to extend from the first end 70 thereof to the second end 72 thereof. As those skilled in the art would appreciate, the vane 32 assists in controlling the flow of fluid moving through and passed the vane 32.

In practice, operation of the flow meter 10 is achieved in the following manner. The flow meter 10 is furnished with a 2½" NST Female inlet end 20 shaped and dimensioned for attachment to a 2½" inlet pipe and a 2½" NST male outlet end 18 shaped and dimensioned for attachment to a 2½" nozzle 28. The flow meter 10 is connected directly to a hose, hydrant, or hose header. The discharge may for example, be connected to a flow diverter as disclosed in U.S. Pat. No. 7,137,568, which is incorporated herein by reference, and sold under the name FLOWBUSTER®.

The pressure gauge 26 is connected to the flow meter and the operator is ready for flow. When water flows, air is bled from the system and the pressure at each point of interest during the test are measured (including the pressure at the gauge tap 24 of the cylindrical body 12 where the pressure gauge 26 has been secured).

Figure 7:
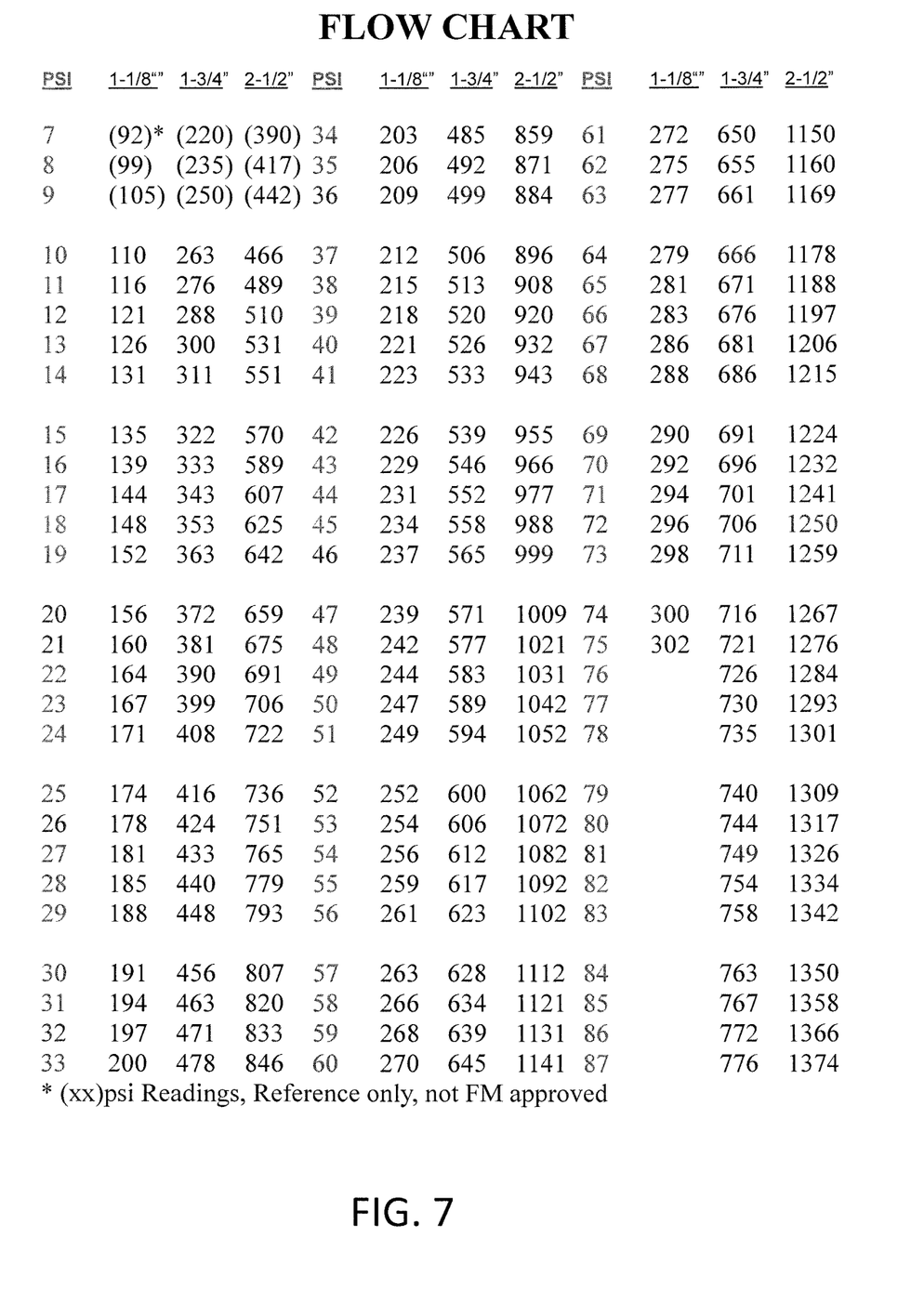
FIG. 7 is an exemplary flow chart of desirable nozzle diameters and flow rates.

The pressure gauge reading is converted to actual GPM by looking on a flow chart for the specific configuration being tested (each flow meter configuration will have a different "K" factor which can be used to calculate the flow if using computer programs). Such a flow chart, including the calculations associated therewith are well known and the calculations are covered by standard physical laws relating to fluid flow. An exemplary chart is shown in FIG. 7.

The readings will provide an accuracy of 98% or better throughout the approved flow range for the flow meter 10. As discussed above, each flow meter 10 has a specific approved flow range and two nozzle inserts 30 are provided to extend the range of the flow meter. The approximate ranges are shown below:

1⅛" inner diameter nozzle insert—107-295 gpm
1¾" inner diameter nozzle insert—310-700 gpm
Flow meter without Inserts (that is, full 2.5" discharge) 500-1100 gpm Referring to FIGS. 6A to 6D, when using one of the two flow inserts 30 for accuracy in the lower flow ranges, the nozzle inserts 30 are added or removed using the convenient threaded coupling structure describe above.

When a pressure gauge with remote reading is used, it should be remembered to account for any elevation difference between the flow meter and the test gauge (if the line for the pressure gauge has been flushed with water before reading). The distance to the remote read point is not important but the elevation difference is important. As such, it is recommended that air always be bled out of the line before taking any readings.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A flow meter, comprising:
a cylindrical body having an exterior surface and an interior surface defining an inner diameter of the cylindrical body, as well as an outlet having an inner diameter and an inlet end having an inner diameter, the interior surface of the cylindrical body is tapered to increase in diameter as the interior surface of the cylindrical body extends from the inlet end towards the outlet end defining a tapered section and thereafter the inner diameter of the cylindrical body remains consistent for a section defining a consistent diameter section, the inner diameter of the inlet end is the same as the inner diameter of the outlet end, the inlet end being shaped and dimensioned for selective attachment to an inlet pipe;
a gauge tap formed within the cylindrical body at which pressure is measured within the cylindrical body, the gauge tap being positioned at a gauge tap location in the consistent diameter section of the cylindrical body at a position between the outlet end and the inlet end; and
a nozzle selectively attached at the outlet end of the cylindrical body, the nozzle having an interior surface with an inner diameter at least as large as the inner diameter of the outlet end of the cylindrical body.

2. The flow meter according to claim 1, wherein the nozzle is inters threaded for attachment to the outlet end of the cylindrical body.

3. The flow meter according to claim 1, wherein the outlet end of the cylindrical body is externally threaded to form threads for attachment to the nozzle.

4. The flow meter according to claim 3, wherein the nozzle is selectively attached via threads at the outlet end of the cylindrical body.

5. The flow meter according to claim 1, wherein the inlet end of the cylindrical body is internally threaded.

6. The flow meter according to claim 1, further including at least one vane positioned within the cylindrical body along the interior surface of the cylindrical body, the at least one vane being shaped and dimensioned to prevent swirling flow ahead of the gauge tap location.

7. The flow meter according to claim 6, wherein the at least one vane includes a plurality of vanes.

8. The flow meter according to claim 1, further including at least one nozzle insert.

9. The flow meter according to claim 8, wherein the at least one nozzle insert has a circumference and includes an exterior surface with an external flange extending about the circumference thereof.

10. The flow meter according to claim 8, wherein the at least one nozzle insert includes a tapered inner surface.

11. The flow meter according to claim 8, wherein the at least one nozzle insert includes a plurality of nozzle inserts that may be selectively changed.

12. A flow meter, comprising:
a cylindrical body having an exterior surface and an interior surface defining an inner diameter of the cylindrical body, as well as an externally threaded outlet end and an internally threaded inlet end having an inner diameter, the internally threaded inlet end being shaped and dimensioned tor selective attachment to an inlet pipe;
a gauge tap formed within the cylindrical body at which pressure is measured within the cylindrical body, the gauge tap being positioned adjacent the outlet end of the cylindrical body at a position between the externally threaded outlet end and the internally threaded inlet end, wherein an inner diameter of the cylindrical body at the gauge tap is greater than an inner diameter at the internally threaded inlet end; and
a nozzle attached via threads over the externally threaded outlet end of the cylindrical body, the nozzle having an interior surface with an inner diameter at least as large as the inner diameter of the outlet end of the cylindrical body.

13. The flow meter according to claim 12, further including at least one nozzle insert for selective attachment within the nozzle and the outlet end of the cylindrical body, the nozzle insert having an inner diameter that approximates the inner diameter of the inlet pipe so as to reduce the inner diameter of the outlet end in order to extend a range of the flow meter.

14. The flow meter according to claim 13, wherein the at least one nozzle insert includes a plurality of nozzle inserts that may be selectively changed.

15. The flow meter according to claim 13, wherein the at least one nozzle insert has a circumference and includes an exterior surface with an external flange extending about the circumference thereof.

16. The flow meter according to claim 13, wherein the at least one nozzle insert includes a tapered inner surface.

17. The flow meter according to claim 12, further including a pressure gauge secured to the gauge tap for measuring the pressure within the cylindrical body and ultimately flow of fluid through the cylindrical body.

18. A flow meter, comprising:
a cylindrical body having an exterior surface and al n interior surface defining an inner diameter of the cylindrical body, as ell as an externally threaded outlet end an internally threaded inlet end, the interior surface of the cylindrical body is tapered to increase in diameter as the interior surface of the cylindrical body extends from the inlet end towards the outlet end defining a tapered section, the inlet end being shaped and dimensioned for selective attachment to an inlet;
a gauge tap formed within the cylindrical body at which pressure is measured within the cylindrical body, the gauge tap being positioned beyond the tapered section of the cylindrical body at a position between the outlet end and the inlet end;
a nozzle attached via threads over the outlet end of the cylindrical body; and
at least one nozzle insert for selective attachment within the nozzle and the outlet end of the cylindrical body so as reduce the inner diameter of the outlet end.

19. The flow meter according to claim 18, wherein the at least one nozzle insert includes a tapered inner surface.

20. The flow meter according to claim 18, wherein the at least one nozzle insert has a circumference and includes an exterior surface with an external flange extending about the circumference thereof.

* * * * *